(12) United States Patent
Salter et al.

(10) Patent No.: US 11,932,311 B2
(45) Date of Patent: Mar. 19, 2024

(54) EXTENDABLE RAIL ASSEMBLY FOR CARGO BED OF A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Annette Lynn Huebner, Highland, MI (US); Pietro Buttolo, Dearborn Heights, MI (US); Robert Walsh, Novi, MI (US); Jacob Michael Haspiel, Ann Arbor, MI (US); Joseph Ian Halaszynski, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 17/504,674

(22) Filed: Oct. 19, 2021

(65) Prior Publication Data

US 2023/0118953 A1    Apr. 20, 2023

(51) Int. Cl.
*B62D 33/02* (2006.01)

(52) U.S. Cl.
CPC ................ *B62D 33/0207* (2013.01)

(58) Field of Classification Search
CPC ........... B60R 9/042; B60R 9/04; B60R 9/048; B60R 9/045; B60R 9/00; B60R 5/41; B60P 3/1008; B66C 23/44
See application file for complete search history.

(56) References Cited

U.S. PATENT DOCUMENTS

| | | | | |
|---|---|---|---|---|
| 5,730,304 A | * | 3/1998 | Duncan | B60P 1/5495 212/262 |
| 6,972,689 B1 | * | 12/2005 | Morgan | G09F 21/04 340/908 |
| 8,740,277 B1 | | 6/2014 | Al-Qahtani | |
| 9,849,763 B1 | * | 12/2017 | Sullivan | B60R 9/00 |
| 10,442,474 B2 | * | 10/2019 | Hinz | B62D 33/08 |
| 10,611,219 B2 | | 4/2020 | Trinier | |
| 11,046,164 B2 | | 6/2021 | Kim | |
| 2003/0127875 A1 | * | 7/2003 | Hornick | B60P 7/08 296/32 |

FOREIGN PATENT DOCUMENTS

DE    2511039    9/1976

* cited by examiner

*Primary Examiner* — Corey N Skurdal
(74) *Attorney, Agent, or Firm* — Vichit Chea; Carlson, Gaskey & Olds, P.C.

(57) ABSTRACT

A vehicle assembly includes a cargo bed having a first and a second sidewall. A rail assembly is disposed on the first sidewall. The rail assembly is movable between an extended position and a retracted position relative to the first sidewall. An actuator system raises and lowers the rail assembly to move the rail assembly between the extended position and the retracted position.

17 Claims, 9 Drawing Sheets

EXTENDABLE RAIL ASSEMBLY FOR CARGO BED OF A VEHICLE

TECHNICAL FIELD

This disclosure relates generally to a cargo bed of a vehicle and, more particularly, to a rail assembly that can be used to manage cargo associated with the cargo bed.

BACKGROUND

Many vehicles, such as pickup trucks, include a cargo bed. Various structures have been utilized to help secure and manage cargo held within the cargo bed.

SUMMARY

In some aspects, the techniques described herein relate to a vehicle assembly, including: a cargo bed having a first and a second sidewall; a rail assembly disposed on the first sidewall, the rail assembly movable between an extended position and a retracted position relative to the first sidewall; and an actuator system that raises and lowers the rail assembly to move the rail assembly between the extended position and the retracted position.

In some aspects, the techniques described herein relate to a vehicle assembly, wherein the actuator system is held between an inner panel and an outer panel of the first sidewall.

In some aspects, the techniques described herein relate to a vehicle assembly, further including a pivot bar and a primary rail of the rail assembly, wherein the pivot bar is configured to pivot from a rail orientation to a spanning orientation, the pivot bar extending longitudinally in a direction aligned with the primary rail when the pivot bar is in the rail orientation, the pivot bar spanning across the cargo bed from the first sidewall to the second sidewall when the pivot bar is in the spanning orientation.

In some aspects, the techniques described herein relate to a vehicle assembly, wherein the pivot bar rotates about a vertically extending axis when moving back-and-forth between the rail orientation and the spanning orientation.

In some aspects, the techniques described herein relate to a vehicle assembly, wherein the rail assembly is a first rail assembly, and further including a second rail assembly disposed on the second sidewall, the second rail assembly movable between an extended position and a retracted position relative to the second rail assembly.

In some aspects, the techniques described herein relate to a vehicle assembly, wherein the first and second rail assemblies each include pivot bars that are configured to rotate back-and-forth between a rail orientation and a spanning orientation, the pivot bars aligned with a respective one of the first or second sidewalls when in the rail orientation, the pivot bars spanning across the cargo when in the spanning orientation.

In some aspects, the techniques described herein relate to a vehicle assembly, wherein the actuator system is configured to lower the rail assembly to secure cargo.

In some aspects, the techniques described herein relate to a vehicle assembly, further including a binding that secures the cargo within the cargo bed, wherein the lowering the rail assembly tightens the binding that secures the cargo.

In some aspects, the techniques described herein relate to a vehicle assembly, wherein the rail assembly is a first rail assembly, and further including a second rail assembly disposed on the second sidewall, wherein the binding is coupled to both the first rail assembly and to the second rail assembly, wherein retracting the first and second rail assemblies pulls the binding against the cargo.

In some aspects, the techniques described herein relate to a vehicle assembly, wherein the actuator system is configured to raise the rail assembly to raise cargo.

In some aspects, the techniques described herein relate to a vehicle assembly, wherein cargo is anchored to the rail assembly.

In some aspects, the techniques described herein relate to a vehicle assembly, further including a pivot bar of the rail assembly, the pivot bar configured to pivot to a position where the pivot bar extends horizontally outside the cargo bed, the cargo anchored to the pivot bar when the cargo is anchored to the rail assembly.

In some aspects, the techniques described herein relate to a vehicle assembly, further including at least one bushing that aligns the first rail assembly when the first rail assembly moves between the extended position and the retracted position, the at least one bushing an ultra-high molecular weight polyethylene bushing.

In some aspects, the techniques described herein relate to a vehicle assembly, further including a polymer-based bracket over-molded about the at least one bushing.

In some aspects, the techniques described herein relate to a vehicle assembly, further includes a sheet connected to the first rail assembly, the sheet unfolding as the first rail assembly moves from the retracted position to the extended position.

In some aspects, the techniques described herein relate to a cargo management method, including: using an actuator system to move a rail assembly back-and-forth between an extended position and a retracted position relative to a sidewall of a cargo bed of a vehicle, the rail assembly disposed on the sidewall.

In some aspects, the techniques described herein relate to a cargo management method, wherein the moving tightens a binding over cargo disposed within the cargo bed.

In some aspects, the techniques described herein relate to a cargo management method, further including lifting cargo by moving the rail assembly from the retracted position to the extended position.

In some aspects, the techniques described herein relate to a cargo management method, further including pivoting a pivot bar of the rail assembly from a position where the pivot bar is aligned with a primary rail of the rail assembly to a position where the pivot bar spans over the cargo bed from the sidewall to another sidewall.

In some aspects, the techniques described herein relate to a cargo management method, wherein the pivoting is about a vertical axis. extendable rail assembly for a cargo bed of a vehicle The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary rail assemblies that automatically extend and retract from a sidewall of a vehicle cargo bed. The rail assemblies, in some embodiments, can be utilized to secure cargo within the cargo bed. In some embodiments, the rail assemblies can be used to assist when loading cargo into the cargo bed.

Figure 1:
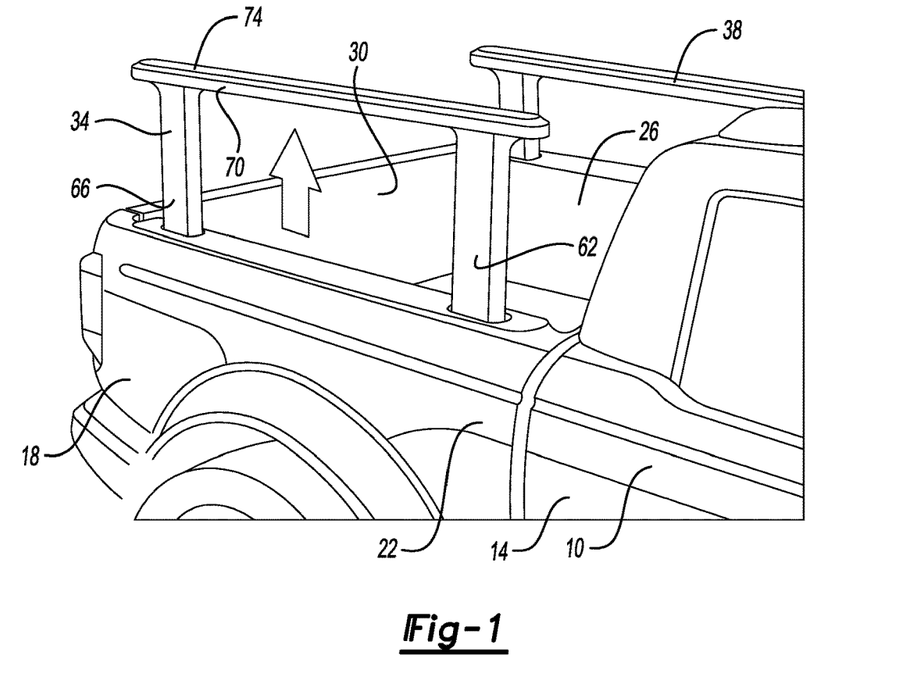
FIG. 1. illustrates a perspective view of a vehicle cargo bed having a rail assemblies in extended positions according to an exemplary embodiment of the present disclosure.
Figure 2:
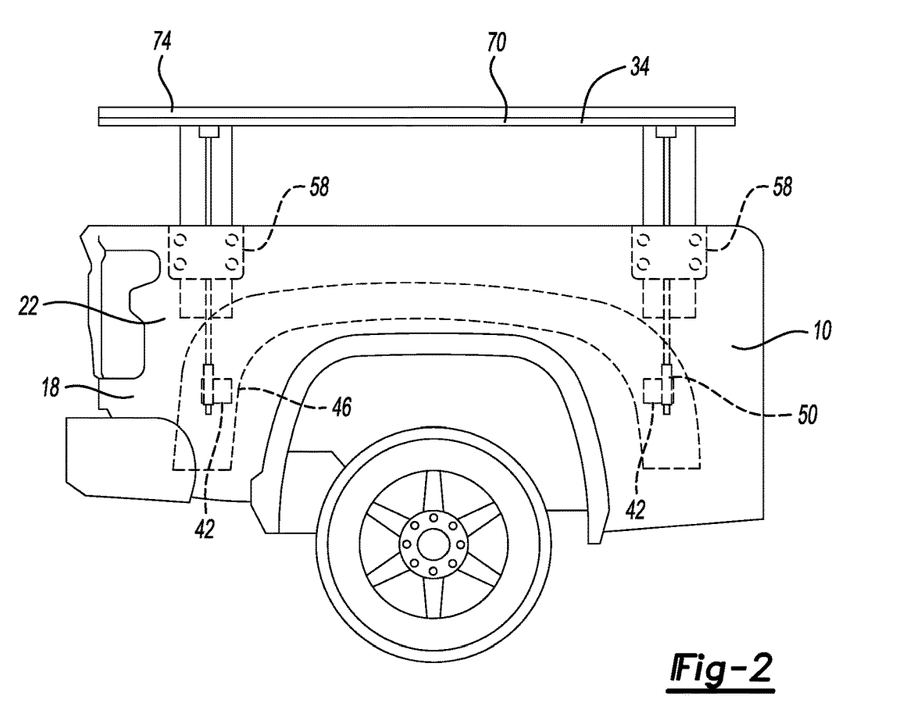
FIG. 2 illustrates a side view of the vehicle cargo bed of FIG. 1.
Figure 3:
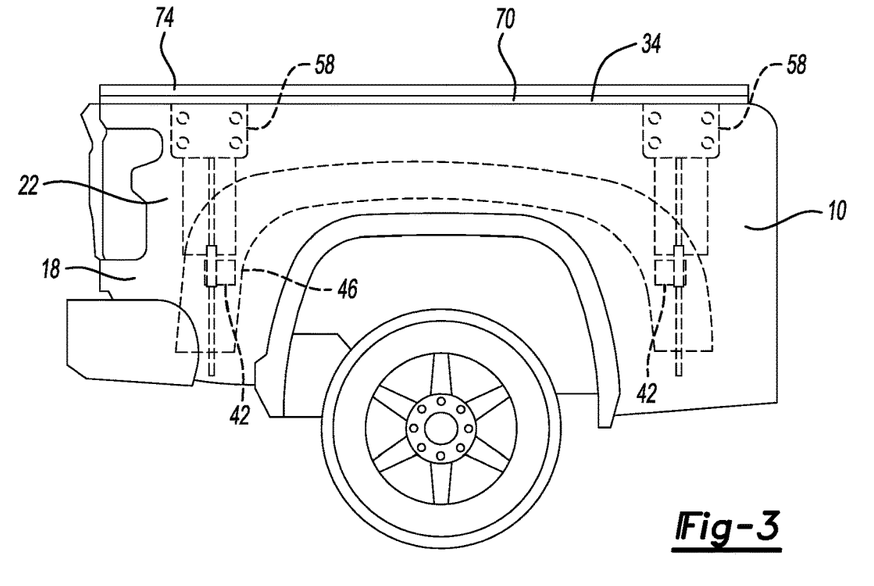
FIG. 3 illustrates the side view of the vehicle cargo bed of FIG. 2 when the rails assemblies are in retracted positions.

With reference to FIGS. 1-3, a vehicle 10 includes a cab 14 and a cargo bed 18. A passenger side sidewall 22 and a driver's side sidewall 26 provide outboard sides of the cargo bed 18. A tailgate 30 establishes a rear boundary of the cargo bed 18. The cab 14 establishes a front wall of the cargo bed 18.

A rail assembly 34 is disposed on the passenger side sidewall 22. Another rail assembly 38 is disposed on the driver's side sidewall 26. The rail assemblies 34 are movable back and forth between the extended position of FIGS. 1 and 2 and the retracted position of FIG. 3.

The rail assemblies 34, 38 automatically move between the extended position and the retracted positions. Two actuators 42 are used, in this example, to move the rail assembly 34. The two actuators 42 provide parts of an actuator system. The actuators 42 can be held between an inner panel and an outer panel of the passenger side sidewall 22. Each actuator 42 can include a sixteen-inch 6,000 Newton electric linear actuator each having a 1,320 lb. max lift and a heavy duty 12-Volt DC motor.

The actuator 42 can rotate and drive the rail assembly 34 back and forth between the extended and the retracted position through a gear train, for example. A reinforcement member 46 can attach to an inner side of the sidewall 22. The actuators 42 can attach to the reinforcement member 46 with twelve-millimeter shoulder bolts. The reinforcement member 46 can help to solidify the actuators 42. In some examples, the actuators 42 can attach to the reinforcement member 46 in a way that permits the actuators 42 to pivot relative to the reinforcement member 46. The actuators 42 include screw type actuators in this example.

Figure 4:
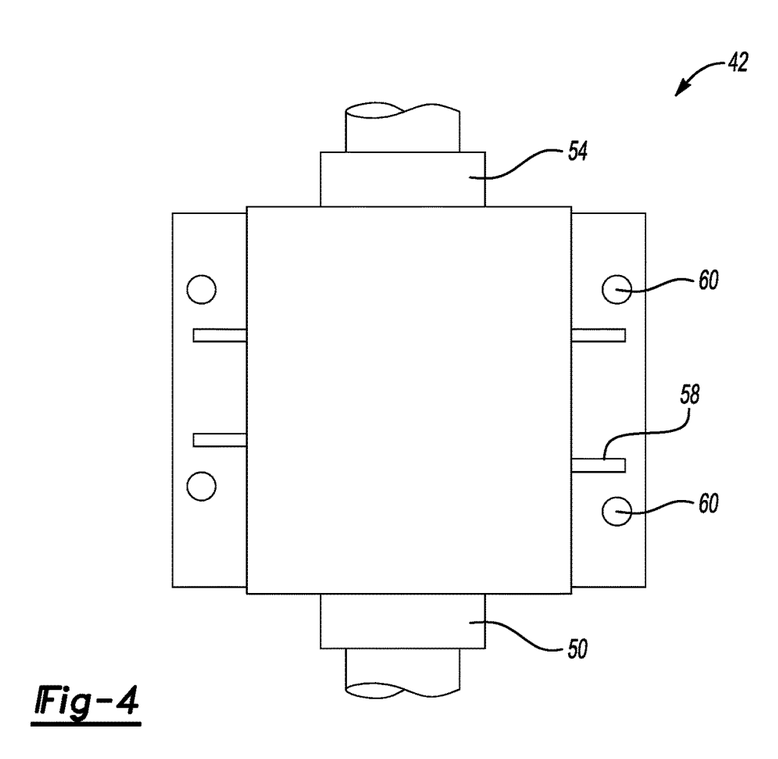
FIG. 4 illustrates a close up view of a bushing used in connection with one of the rails assemblies in FIGS. 2 and 3.

Referring now to FIG. 4 with continuing reference to FIGS. 1-3, the actuators 42 can each rotate rods 50 to raise and lower the rail assembly 34.

The rods 50 can be guided during extension and retraction by a bushing 54. The rods 50 extend through apertures in the respective bushings 54. In this example, a length of the actuators 42 is 38.4 inches when the rods 50 are fully extended, and are 22.6 inches when the rods 50 are retracted.

The bushing 54 can be an ultra-high molecular weight polyethylene bushing that aligns and stabilizes the rods 50 as the respective actuator 42 raises and lowers the rail assembly 34. The bushings 54 can be machined. The bushings 54 can be molded and then cleaned with plasma to enable good adhesion. The bushings 54 can then be inserted into an injection molding machine where a bracket 58 with mounting holes 60 is overmolded about the bushing 54. The bracket 58 can be a polymer-based material, such as a glass-filled polyester (PET). The bracket 58 can be bolted to the sidewall 22 via fasteners that extend through the holes 60.

The bushings 54 can be tapered at each axial end. The tapering can add mechanical strength to the two-shot bond between the bushing 54 and the bracket 58.

The rail assembly 34 includes a forward column 62, an aft column 66, a primary rail 70, and a pivot bar 74. In this example, the rods 50 are disposed within the forward column 62 and the rear column 66. The columns 62, 66 retract within the passenger sidewall 22 when the rail assembly 34 is moved from the extended position to the retracted position.

The rail assembly 38 associated with the driver sidewall 26 is configured similarly to the rail assembly 34. The driver sidewall 26 can include actuators and bushings to move the rail assembly 38 back and forth between extended and retracted positions.

Figure 5:
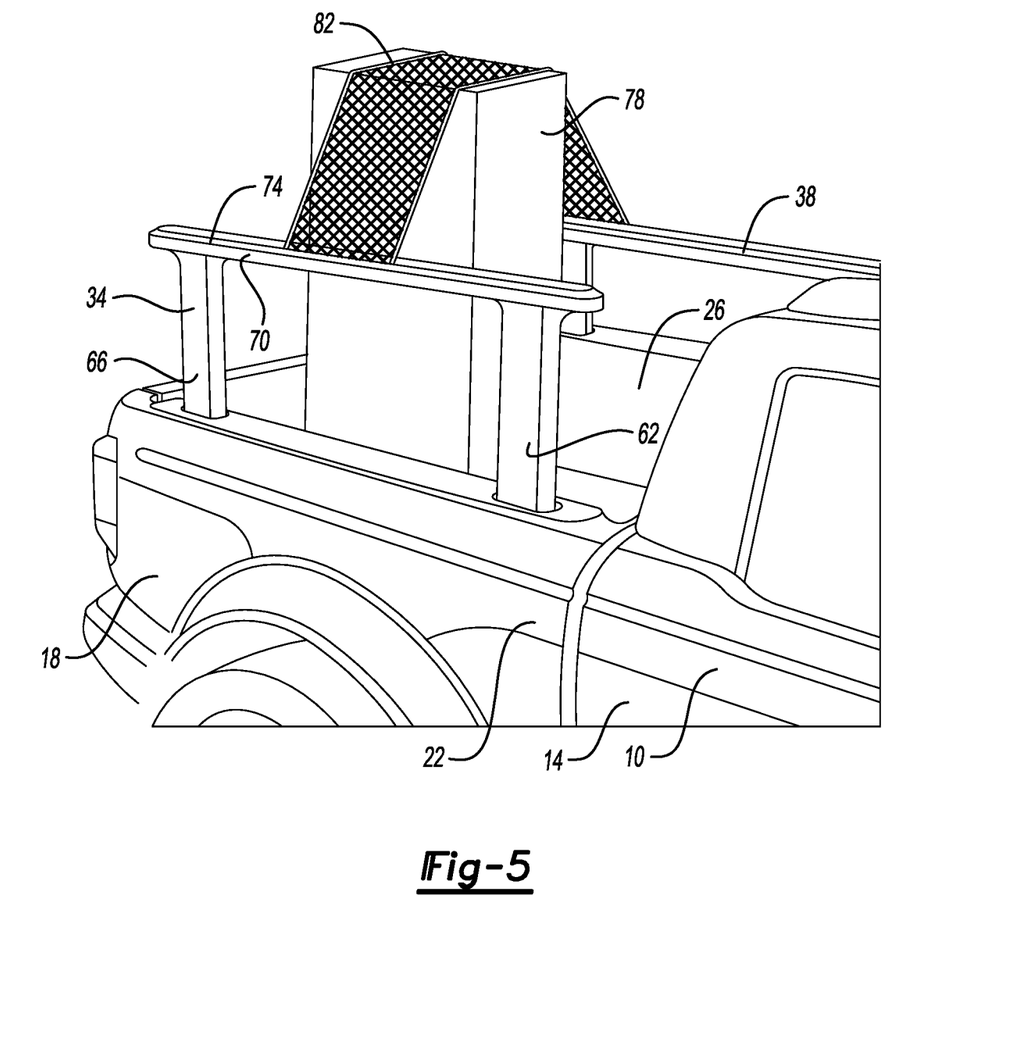
FIG. 5 illustrates the perspective view of FIG. 1 when the rail assemblies are securing a cargo that is in the vehicle cargo bed.

With reference now to FIG. 5, the rail assemblies 34 and 38 can be used together to secure cargo 78. In this exemplary embodiment, a binding 82 extends over the cargo 78. The binding 82 is secured directly to both the rail assembly 34 and the rail assembly 38. The binding 82 is a net in this example. In other examples, the binding 82 could be a rope or strap.

To secure the cargo 78, the actuators 42 can be activated to retract the rail assembly 34 further into the sidewall 22. The actuators associated with the rail assembly 38 can similarly retract the rail assembly 38 into the sidewall 26. Retracting the rail assemblies 34 and 38 pulls vertically downward on the binding 82, which tightens the binding 82 over the cargo 78 to secure the cargo 78 within the cargo bed 18.

Figure 6:
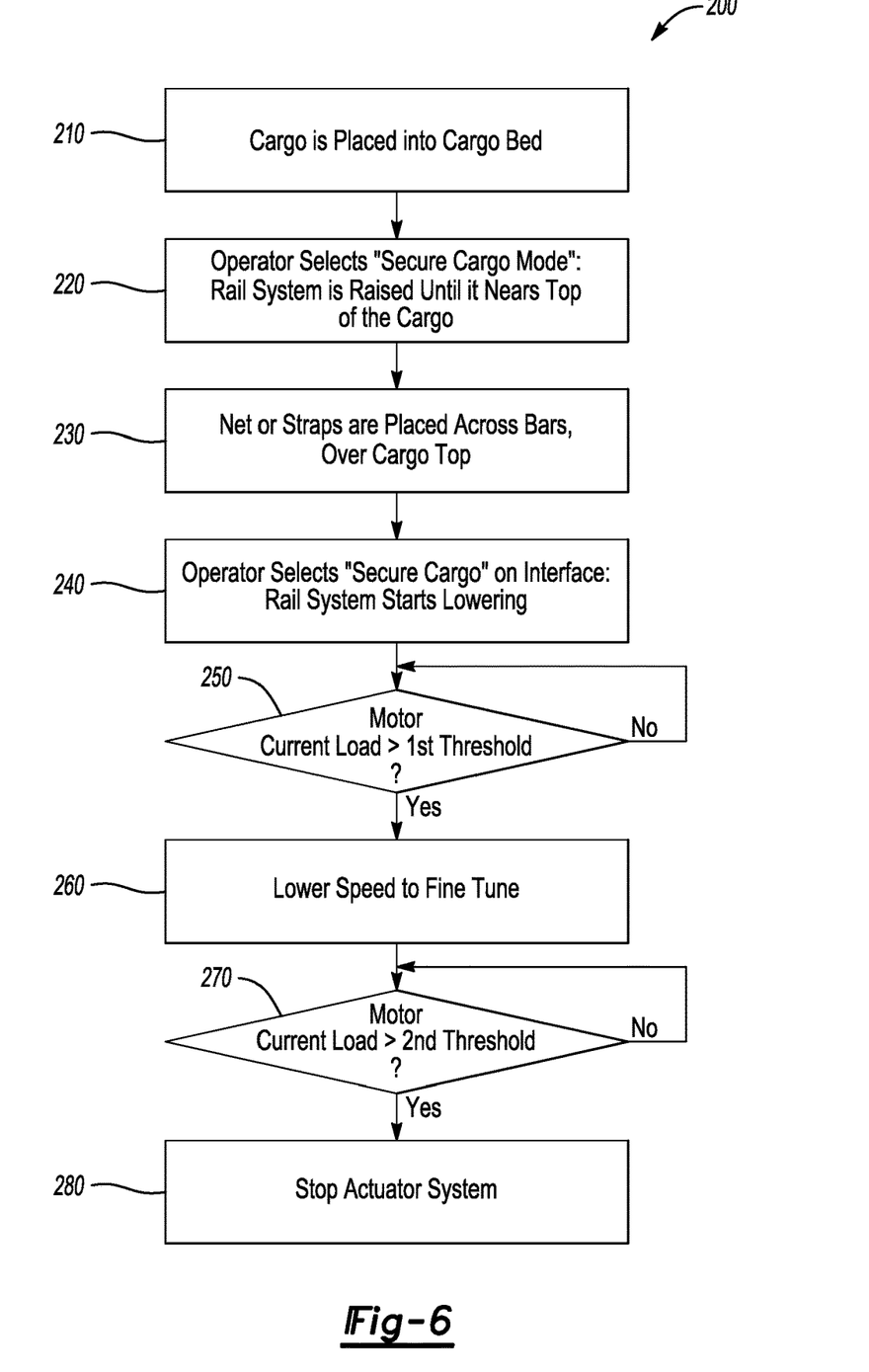
FIG. 6 illustrates a flow of an example method of securing cargo using the rail assemblies.

An example cargo management method utilized with the configuration of FIG. 5 is represented in the flow diagram of FIG. 6. The method 200 begins at a step 210 where the cargo 78 is placed into the cargo bed. Next, at a step 220, an operator can select a "secure cargo mode" through, for example, a human machine interface within the vehicle 10.

In response to entering the secure cargo mode, the rail assemblies 34 and 38 are raised until they are substantially aligned with a vertical top of the cargo 78. Cameras of the vehicle 10 can help to determine a position of the rail assemblies 34 and 38 relative to the cargo 78 and data from the cameras can be utilized to determine when to stop the raising.

Next, at a step 230, the binding 82 is placed over the cargo 78 and secured to the rail assemblies 34 and 38. Then, at a step 240, the operator selects "secure cargo" through, for example, the user interface within the vehicle 10. In response, the rail assemblies 34 and 38 are lowered.

At a step 250, the actuators 42 continue to lower the rail assembly 34, and other actuators lower the rail assembly 38 until a current cargo on motors of the actuators exceeds a first threshold. The operator could, in some examples, instead select a desired tension for the binding 82.

The method 200 then moves to a step 260 where the speed of the retraction is reduced. At a step 270, the lowering continues until the current cargo reaches a second threshold. After which, the actuators 42 associated with the rail assembly 34 and the other actuators associated with the rail assembly 38 are stopped at a step 280. The rail assemblies 34 and 38 could be adjusted to apply tension as the vehicle 10 is driven to inhibit the cargo 78 from shifting.

Figure 7:
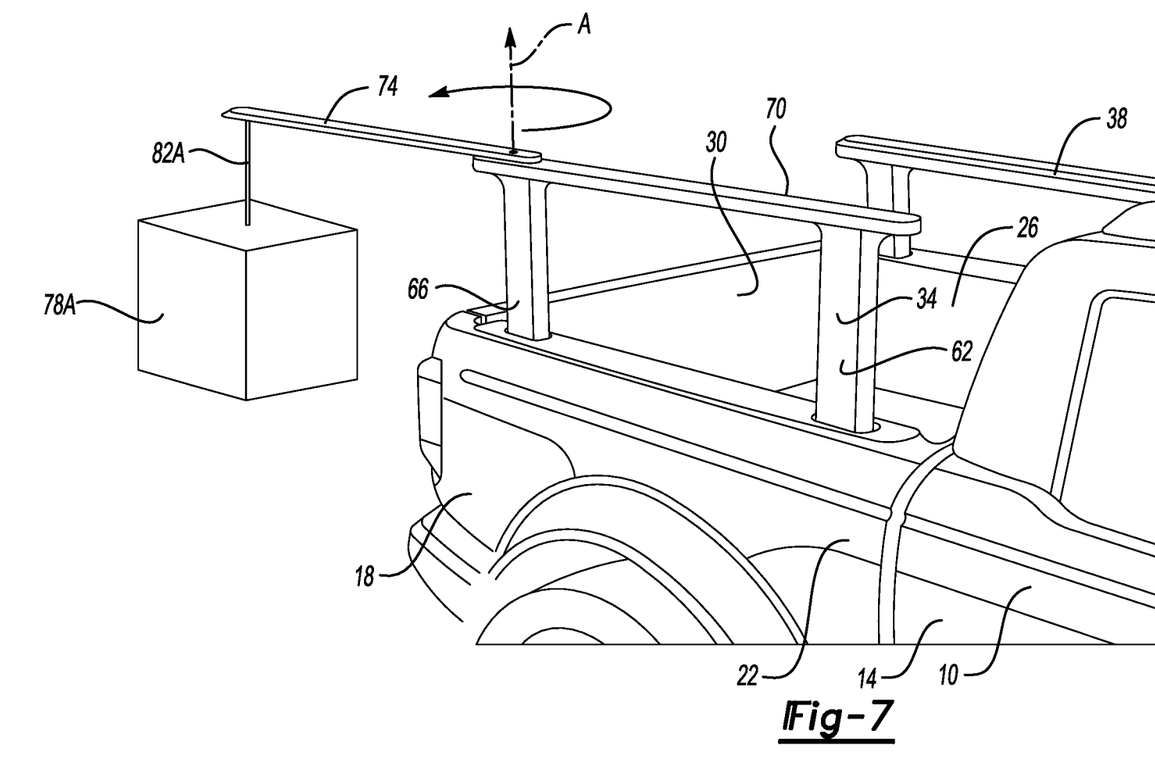
FIG. 7 illustrates the perspective view of FIG. 1 when the rail assemblies are lifting cargo.

The rail assemblies 34 and 38 can be utilized to manage cargos in other ways. Referring now to FIG. 7, the rails assembly 34 manages cargo 78A by lifting the other cargo 78A to assist with moving the cargo 78A into the cargo bed 18.

To lift the cargo 78A, the pivot bar 74 is pivoted about an axis A relative to the primary rail 70. The axis A is a vertically extending axis in this example. Pivoting the pivot bar 74 positions the pivot bar 74 in a position where the pivot bar 74 extends aft the vehicle 10 beyond the tailgate 30 and horizontally outside the cargo bed 18. A binding 82A, here a rope, is then used to anchor the cargo 78A to the rail assembly 34 through the pivot bar 74.

After the cargo 78A is secured, the rail assembly 34 can be extended vertically to lift the cargo 78A. The tailgate 30 can then be dropped or opened and the pivot bar 74 rotated about the axis A toward the primary rail 70 until the cargo 78A is within the cargo bed 18. The pivoting may be driven by an actuator or in response to the operator loading the pivot bar 74.

Figure 8:
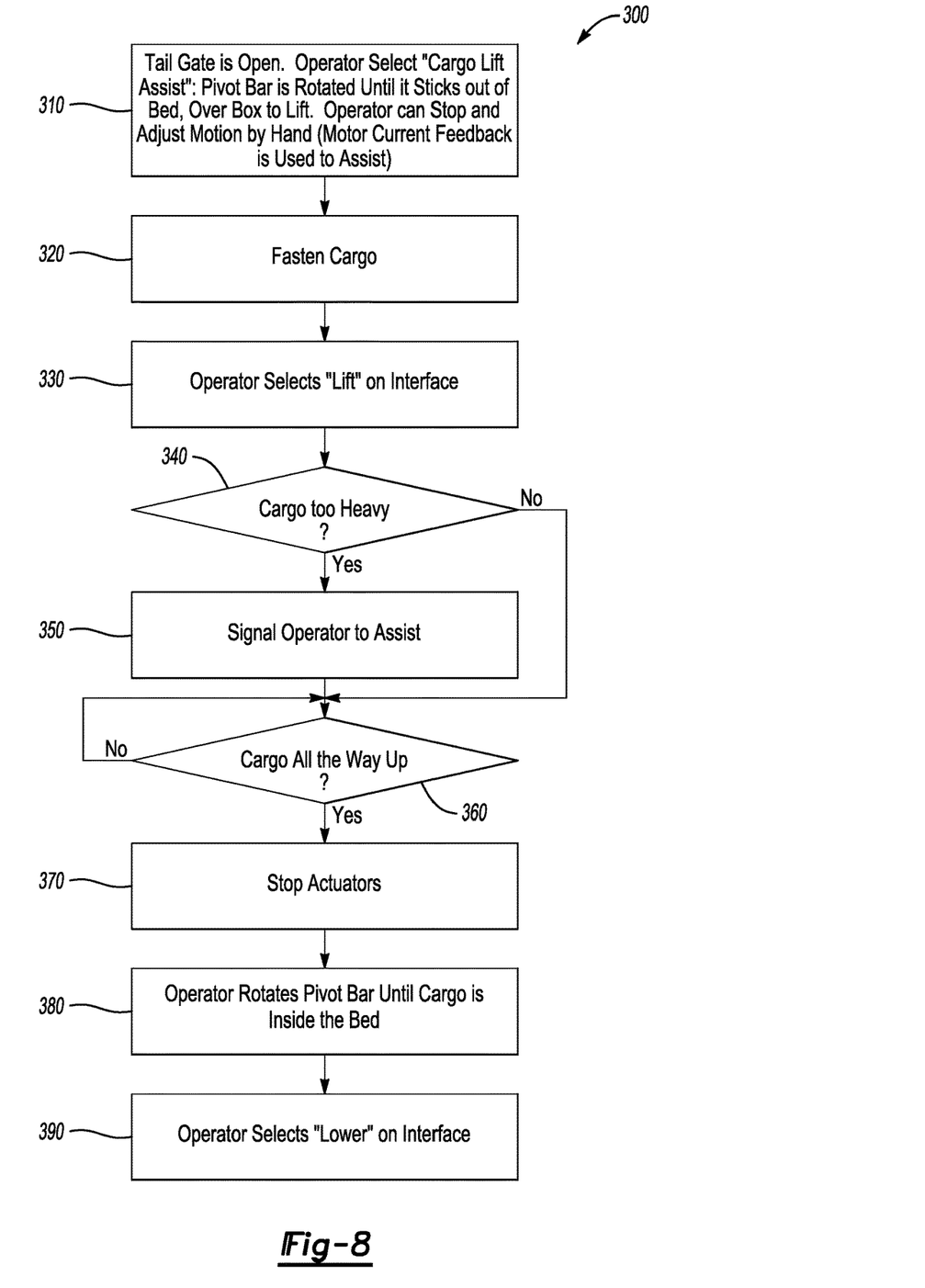
FIG. 8 illustrates a flow of an example method of lifting cargo using the rail assemblies.

With reference to FIG. 8, an example method 300 of cargo management utilized in connection with FIG. 7 begins at a step 310 where the tailgate 30 is opened and an operator selects a "cargo lift assist" mode. The pivot bar 74 is then rotated relative to the primary rail 70 until the pivot bar 74 sticks out aft of the cargo bed 18 as shown in FIG. 7.

Next, at a step 320, the cargo 78A is fastened to the pivot bar 74A. At a step 330, the operator selects "lift" on an interface. As the cargo 78A is lifted, current provided to the motors of the actuators 42 can be utilized to assess a weight of the cargo 78A.

If, at a step 340, the cargo 78A is too heavy for the rail assembly 34 to lift, a signal is provided to the operator at a step 350 indicating that the operator needs to assist with lifting the cargo 78A. At a step 360, the method 300 assesses whether the cargo 78A is lifted to a position suitable for pivoting the pivot bar 74 to move the cargo 78A into the cargo bed 18. If yes, the method 300 moves to the step 370 where the actuators 42 are stopped.

Next, at a step 380 the operator can assist by rotating the pivot bar 74 about the axis A to move the cargo 78A into the cargo bed 18. The operator, then, at a step 390, selects "lower" on the interface. In response, the rail assembly 34 lowers until the current for motors in the actuators 42 falls below a threshold level and the cargo 78A is disposed within the cargo bed 18.

Figure 9:
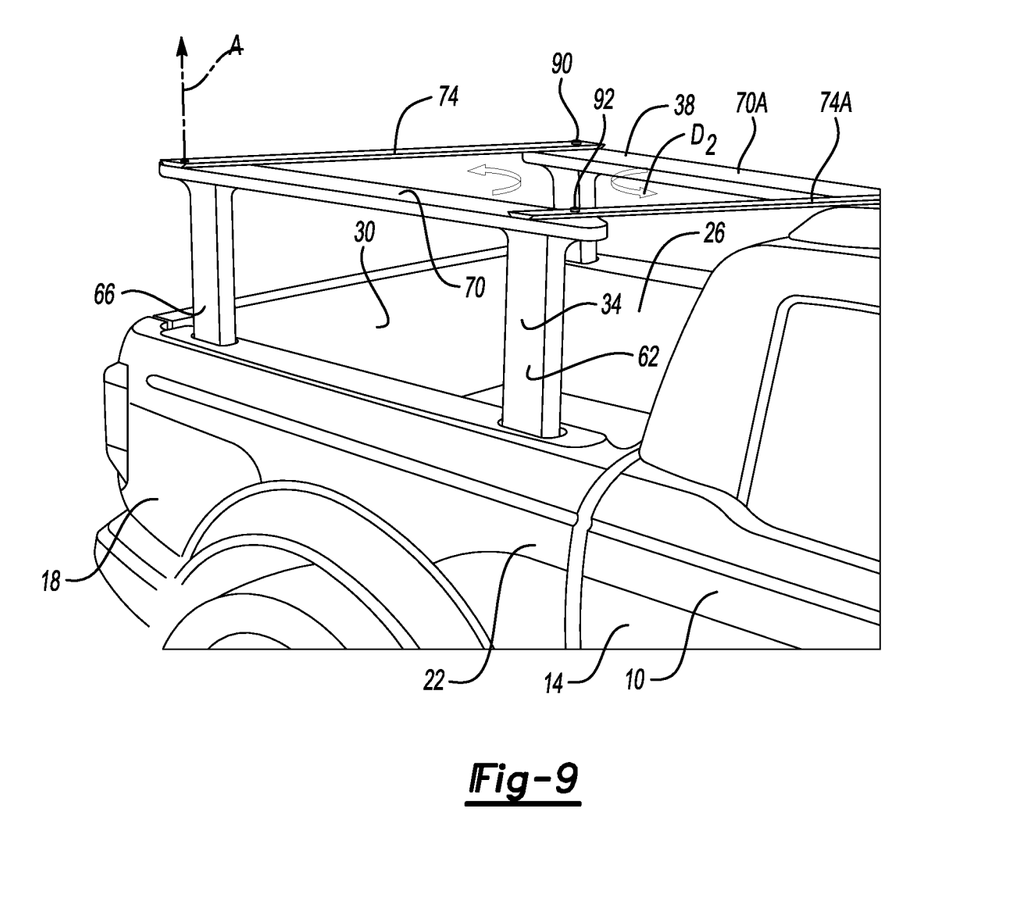
FIG. 9 illustrates the perspective view of FIG. 1 after pivot bars of the rail assemblies have been rotated to a spanning orientation.

With reference now to FIG. 9, the pivot bars 74 of the rail assemblies 34 can be repositioned into the spanning orientation shown. In the spanning orientation, the pivot bar 74 is rotated about the axis A to the spanning orientation from a rail orientation as shown in FIG. 9. In the spanning orientation, the pivot bar 74 of the rail assembly 34 spans across the cargo bed 18 from the rail assembly 34 to the rail assembly 38. When the pivot bar 74 is in the rail orientation of FIG. 1, the pivot bar 74 and the primary rail 70 of the rail assembly 34 are aligned. That is, the pivot bar 74 extends longitudinally in a direction aligned with the primary rail 70. A pin 90 can be inserted into the pivot bar 74 to help secure an end of the pivot bar 74 to the rail assembly 38.

The rail assembly 38 includes a pivot bar 74A that pivots about another vertically extending axis relative to a primary rail 70A of the rail assembly 38. The pivot bar 74A of the rail assembly 38 can be coupled to the rail assembly 34 with a pin 92. The pivot bar 74A provides a spoiler at the front of the cargo bed 18. The pivot bar 74 can be pivoted to the spanning orientation to provide a spoiler at the aft of the cargo bed 18. Forward and aft are with reference to a general orientation of the vehicle 10. Similarly, vertical, for purposes of this disclosure, is with reference to ground and a general orientation of the vehicle 10.

Figure 10:
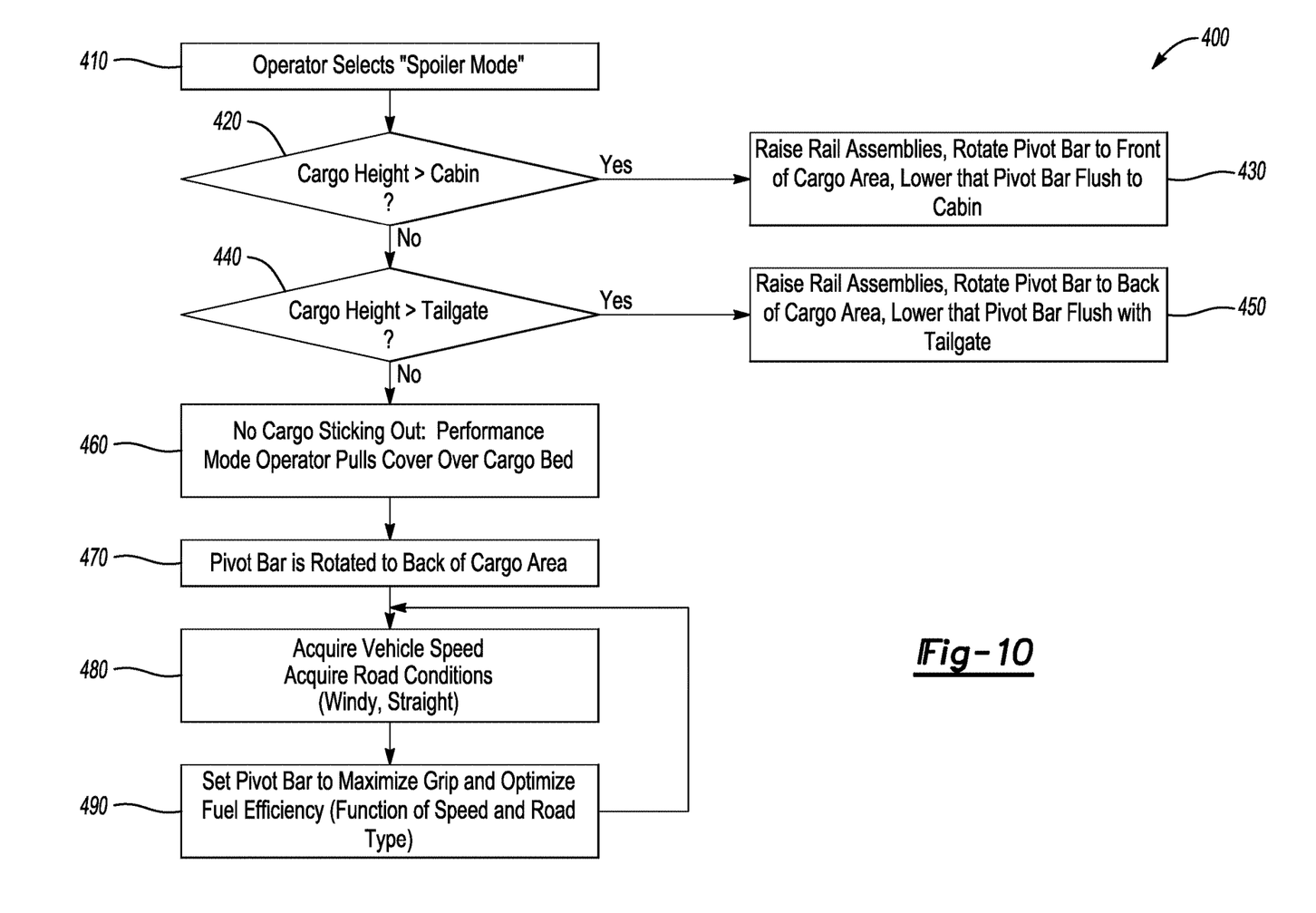
FIG. 10 illustrates a flow of an example method of transitioning the rail assemblies to spanning orientation.

A method 400 associated with positioning the pivot bars 74 and 74A in FIG. 9 begins at a step 410 where an operator selects a spoiler mode. The selection can be made from within an interface of the vehicle 10. The method 400 then, at a step 420, assesses whether a height of cargo within the cargo bed 18 is greater than the height of the cab 14 of the vehicle 10. If yes, the rail assemblies 34 and 38 are raised at a step 430 and the pivot bar 74A of the rail assembly 38 is rotated to the position of FIG. 9. The rail assemblies 34 and 38 can then be lowered so that the pivot bar 74 is substantially vertically aligned with a vertical top of the cab. As the vehicle 10 is driven, the pivot bar 74A can help to reduce turbulence over the cargo.

If, at the step 420, a height of the cargo is not greater than a height of the cab 14, the method 400 assesses, at a step 440, if the height of the cargo is greater than a height of the tailgate 30. If yes, the rail assemblies 34 and 38 are raised and the pivot bar 74 rotated to the position of FIG. 9. The pivot bar 74 can be vertically aligned to be substantially flush with the tailgate 30 to help reduce turbulence associated with the cargo carried within the cargo bed 18.

At the step 440, if a height of the cargo within the cargo bed 18 is not greater than the height of the tailgate 30, the method 400 moves to the step 450 which assesses that no cargo is sticking out and considers the vehicle 10 to be in a performance mode.

An operator, at a step 460 can then pull a cover over the cargo bed 18. The pivot bars 74 and 74A are then both rotated to the position of FIG. 9. Vehicle speed and road conditions are then acquired at a step 470 and a height of the pivot bars 74 and 74a is adjusted by raising and lowering the rail assemblies 34 and 38 to set a height of the pivot bars 74 and 74a at a position that maximizes grip and optimizes fuel efficiency for the vehicle 10 as shown at the step 480.

In some examples, when in the spanning orientation, the pivot bars 74, 74A can be tilted about a cross-vehicle axis to provide a desired angle of attack.

Figure 11:
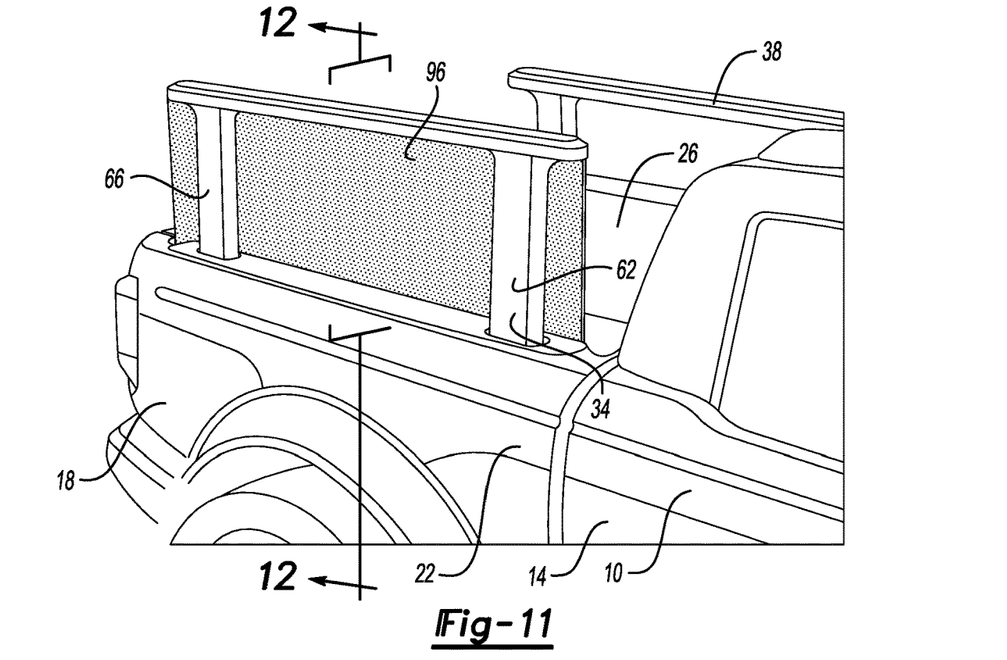
FIG. 11 illustrates a sheet connected to one of the rail assemblies.
Figure 12:
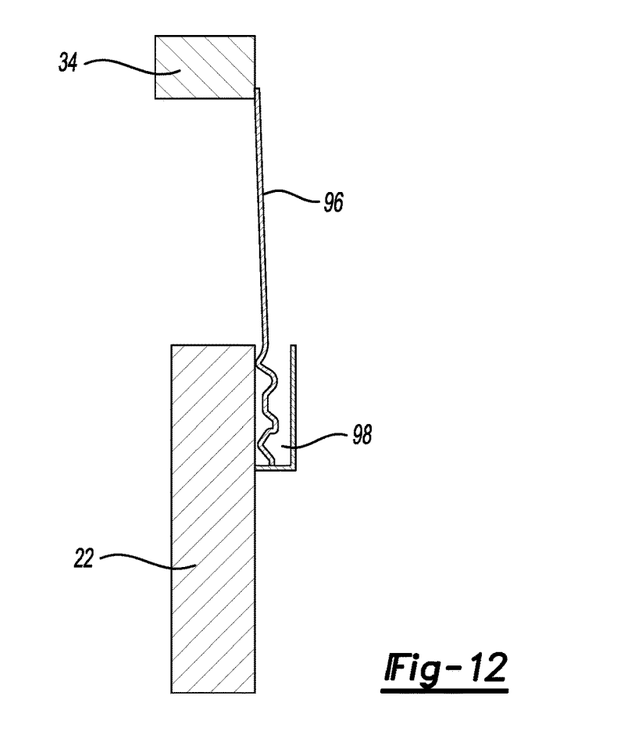
FIG. 12 illustrates a section taken at line 12-12 in FIG. 11.

With reference now to FIGS. 11-12, a sheet sep can be connected to the rail assembly 34. Another sheet (not shown) can be connected to the rail assembly 38. As the rail assembly 34 is raised to the extended position, the sheet 96 unfolds to the position of FIGS. 11-12. When the rail assembly 34 is retracted to a retracted position, the sheet 96 is refolded into a container 98 along an interior of the sidewall 22. The sheet 96 can shield cargo from view, for example. The sheet 96 can include ultra-high-molecular-weight polyethylene.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly, comprising:
a cargo bed having a first and a second sidewall;
a rail assembly disposed on the first sidewall, the rail assembly movable between an extended position and a retracted position relative to the first sidewall;
an actuator system that raises and lowers the rail assembly to move the rail assembly between the extended position and the retracted position, wherein the actuator system is configured to lower the rail assembly to secure cargo;
at least one bushing that aligns the first rail assembly when the first rail assembly moves between the extended position and the retracted position, the at least one bushing an ultra-high molecular weight polyethylene bushing; and
a polymer-based bracket over-molded about the at least one bushing.

2. The vehicle assembly of claim 1, wherein the actuator system is held between an inner panel and an outer panel of the first sidewall.

3. The vehicle assembly of claim 1, further comprising a pivot bar and a primary rail of the rail assembly, wherein the pivot bar is configured to pivot from a rail orientation to a spanning orientation, the pivot bar extending longitudinally in a direction aligned with the primary rail when the pivot bar is in the rail orientation, the pivot bar spanning across the cargo bed from the first sidewall to the second sidewall when the pivot bar is in the spanning orientation.

4. The vehicle assembly of claim 3, wherein the pivot bar rotates about a vertically extending axis when moving back-and-forth between the rail orientation and the spanning orientation.

5. The vehicle assembly of claim 1, wherein the rail assembly is a first rail assembly, and further comprising a second rail assembly disposed on the second sidewall, the second rail assembly movable between an extended position and a retracted position relative to the second rail assembly.

6. The vehicle assembly of claim 5, wherein the first and second rail assemblies each include pivot bars that are configured to rotate back-and-forth between a rail orientation and a spanning orientation, the pivot bars aligned with a respective one of the first or second sidewalls when in the rail orientation, the pivot bars spanning across the cargo when in the spanning orientation.

7. The vehicle assembly of claim 1, further comprising a binding that secures the cargo within the cargo bed, wherein the lowering the rail assembly tightens the binding that secures the cargo.

8. The vehicle assembly of claim 7, wherein the rail assembly is a first rail assembly, and further comprising a second rail assembly disposed on the second sidewall, wherein the binding is coupled to both the first rail assembly and to the second rail assembly, wherein retracting the first and second rail assemblies pulls the binding against the cargo.

9. The vehicle assembly of claim 1, wherein the actuator system is configured to raise the rail assembly to raise cargo.

10. The vehicle assembly of claim 9, wherein cargo is anchored to the rail assembly.

11. The vehicle assembly of claim 10, further comprising a pivot bar of the rail assembly, the pivot bar configured to pivot to a position where the pivot bar extends horizontally outside the cargo bed, the cargo anchored to the pivot bar when the cargo is anchored to the rail assembly.

12. The vehicle assembly of claim 1, further comprising at least one bushing that aligns the first rail assembly when the first rail assembly moves between the extended position and the retracted position, the at least one bushing an ultra-high molecular weight polyethylene bushing.

13. The vehicle assembly of claim 1, further comprises a sheet connected to the first rail assembly, the sheet unfolding as the first rail assembly moves from the retracted position to the extended position.

14. A cargo management method, comprising:
using an actuator system to move a rail assembly back-and-forth between an extended position and a retracted position relative to a sidewall of a cargo bed of a vehicle, the rail assembly disposed on the sidewall, wherein the moving tightens a binding over cargo disposed within the cargo bed.

15. The cargo management method of claim 14, further comprising lifting cargo by moving the rail assembly from the retracted position to the extended position.

16. The cargo management method of claim 14, further comprising pivoting a pivot bar of the rail assembly from a position where the pivot bar is aligned with a primary rail of the rail assembly to a position where the pivot bar spans over the cargo bed from the sidewall to another sidewall.

17. The cargo management method of claim 16, wherein the pivoting is about a vertical axis.

* * * * *